US008079792B2

(12) United States Patent
Mueller et al.

(10) Patent No.: US 8,079,792 B2

(45) Date of Patent: Dec. 20, 2011

(54) LOAD SUSPENSION DEVICE

(75) Inventors: Conrad Mueller, Zell Am Main (DE); Armin Kluth, Wuerzburg (DE)

(73) Assignee: Noell Mobile Systems GmbH, Wuerzberg (DE)

( * ) Notice: Subject to any disclaimer, the term of this patent is extended or adjusted under 35 U.S.C. 154(b) by 14 days.

(21) Appl. No.: 12/803,293

(22) Filed: Jun. 23, 2010

(65) Prior Publication Data

US 2010/0329810 A1 Dec. 30, 2010

(30) Foreign Application Priority Data

Jun. 26, 2009 (DE) ........................ 10 2009 030 812

(51) Int. Cl.
*B60P 7/08* (2006.01)

(52) U.S. Cl. ........................................................ 410/68

(58) Field of Classification Search .................... 410/44, 410/68, 77, 80, 81, 82, 83, 85; 294/81.21; 248/298.1, 346.2, 346.03, 500

See application file for complete search history.

(56) References Cited

U.S. PATENT DOCUMENTS

| | | | | |
|---|---|---|---|---|
| 4,209,195 | A | 6/1980 | Holmes | |
| 6,210,088 | B1 * | 4/2001 | Crosby | 410/35 |
| 6,390,742 | B1 * | 5/2002 | Breeden | 410/77 |
| 7,040,848 | B2 * | 5/2006 | Sain | 410/46 |
| 7,152,895 | B1 | 12/2006 | Jussila et al. | |
| 7,402,015 | B2 * | 7/2008 | Cullum et al. | 410/80 |
| 7,422,400 | B2 * | 9/2008 | Hsieh | 410/85 |
| 7,883,305 | B2 * | 2/2011 | Watson | 410/82 |

FOREIGN PATENT DOCUMENTS

| | | |
|---|---|---|
| DE | 29 40 117 | 4/1980 |
| DE | 44 27 891 | 10/1995 |
| DE | 195 03 866 | 7/1996 |
| DE | 600 20 371 | 10/2005 |

* cited by examiner

*Primary Examiner* — Stephen Gordon

(74) *Attorney, Agent, or Firm* — Collard & Roe, P.C.

(57) ABSTRACT

A load suspension device that can be adjusted, locked, and braced horizontally, by hydraulics, has an extension device for length adjustment, and consists of two supporting parts and a hydraulic operating element having two work chambers, which is connected with one of the supporting parts and supports itself in the other supporting part, and adjusts these relative to one another. There is a pressure line and a tank line, a controller, a measurement sensor disposed on the hydraulic operating element or on the extension device, and a pressure measurement system. The extension device remains braced when the system is without current or pressure or when current or pressure is applied. The device is inexpensive to construct, service and maintain, minimizes damage due to impact of the supporting parts with an obstacle, and avoids impact stresses on the operating element from the hydraulic system.

21 Claims, 15 Drawing Sheets

LOAD SUSPENSION DEVICE

CROSS REFERENCE TO RELATED APPLICATIONS

Applicants claim priority under 35 U.S.C. 119 of German Application No. 10 2009 030 812.1 filed Jun. 26, 2009.

BACKGROUND OF THE INVENTION

1. Field of the Invention

The invention relates to a load suspension device that can be braced horizontally with hydraulics. The load suspension device that can be adjusted, locked, and braced horizontally, via hydraulics, can be used with container spreaders that must be adjusted and locked. However, the area of use is not limited to these load suspension devices, but rather includes situations wherever hydraulic work elements or load suspension devices must be adjusted, locked, and braced.

2. The Prior Art

Freight containers are handled with special load suspension devices, such as spreaders. Since there are different, raster-type lengths of these freight containers, it is necessary for the load suspension device to be able to adapt to this changed length.

Usually, this is done in so-called telescope spreaders, which are constructed so that the spreader can change the distance between its load suspension points—the twist locks—in the raster lengths of the containers.

This is achieved by providing two extension bars disposed in the longitudinal container axis, in opposite directions, that run in a base frame that hangs on the support device, in a horizontally displaceable manner, and are locked in the base frame in a position corresponding to the container length, with shape fit.

For this purpose, each extension bar is horizontally displaced by a hydraulic cylinder, and brought into position. This is accomplished by applying oil pressure to one of the work spaces, depending on the desired direction of movement, and when the desired telescope position is reached, the pressure is shut off.

The aforementioned locking device consists, for each extension bar, of a bolt that is disposed perpendicular to the longitudinal container axis, hydraulically activated, and biased with a spring, which bolt drops into a lock on the extension bar in the pressure-free state, and thus locks the extension device in the desired position.

Usually, the bolt is pulled out of the lock in the pressurized state, using the hydraulic cylinder. Thus, the extension bar is released for a horizontal movement.

Because of the gate closure, the system must be viewed as very rigid; in the case of collisions of the extension bar with standing containers or other obstacles in the handling facility, great forces act on the extension bar, and these can lead to destruction of the locking device.

Also, the unavoidable play in the lock in the event of horizontal movements of the work machine brings about acceleration forces and braking forces and impacts on the spreader and on the load suspension. This leads to great stress on all of the modules involved, particularly in the case of a load suspension device as it is usual in straddle carriers, for example. Finally, the locking device, as an independent module, also requires its own control, and this results in indirect costs, along with the direct costs for the module.

German Patent Application No. DE 29 40 117 A1 describes a spreader arrangement consisting of a base section and at least one section that can be moved in and out by a piston/cylinder unit. The spreader arrangement has a hydraulic circuit with a reservoir and a source for a hydraulic pressure medium as well as lines, which connect the reservoir and the source with the piston/cylinder unit and with a solenoid valve disposed in the lines. Furthermore, there is an electrical control circuit for the solenoid valve, having a power source, solenoids for activation of the solenoid valve, a selection switch that can be manually activated, for optional excitation of one of the solenoids, and holding means for maintaining the excitation of a solenoid when the selection switch is moved back into a neutral position, and for preventing simultaneous excitation of both solenoids. Furthermore, a position control device for shutting off one of the solenoids is provided, once the extendable section reaches a predetermined location with reference to the base section. In the system, all mechanical locking devices in the form of pins or the like, for locking the individual sections in place relative to one another once a predetermined position has been reached, are eliminated. The document furthermore shows an electrical and hydraulic control system with which the spreader sections can be precisely adjusted to the different container lengths. The control system can be switched to the different containers, having numerous different lengths, with only minimal modification.

German Patent Application No. DE 44 27 891 C1 describes a pressure-medium-activated gripper for stones that must be aligned, conveyed, and set down, by layers, whereby multiple pressure-medium drives work one after the other in a time sequence. At least two pressure-medium drives that work one after the other are connected with a common pressure-medium circuit, and the pressure-medium drive that works first is connected, on the pressure side, with a valve that responds to a predetermined response pressure, which valve switches the work pressure to a pressure-medium drive that works subsequently.

German Patent Application No. DE 195 03 866 C1 describes a spreader for four-point suspension of containers equipped with corner fittings, which spreader has a hydraulic device with which the spreader can be adjusted. A locking possibility for the hydraulic device or for the spreader is not described.

German Patent Application No. DE 600 20 371 C1 describes a container handling device consisting of a spreader having two telescoping forks, which are displaceable relative to one another. Adjustment of the spreader takes place with cables, but these are not biased.

These previous devices have several disadvantages, including: shape-fit locking devices, higher costs due to wear, and damage due to impact of the extension bar with obstacles, all of which result in failure of the load suspension device and shut-down times. Furthermore, as a result of impact stress, a transfer to the work machine, for example the lift or industrial truck, comes about.

SUMMARY OF THE INVENTION

It is therefore an object of the invention to develop a device that can be produced at little cost, eliminates play in the locking device of the extension device, avoids damage in the event of impact of the extension bar with an obstacle, and avoids stress and damage of the work machine in the event of collision of the spreader with obstacles.

This object is accomplished by means of a load suspension device that can be adjusted, locked, and braced, by means of hydraulics, and having an extension device for longitudinal adjustment. The device has two supporting parts that can be moved relative to one another and a hydraulic operating element with two work chambers. The hydraulic element is firmly connected with one of the supporting parts, is supported in the other supporting part, and adjusts the two supporting parts, relative to one another, by means of its movement. The supporting parts can represent an extension bar and a base frame of a spreader. The hydraulic operating element can represent a hydraulic cylinder with a piston and one or two piston rods. However, other possibilities are a hydromotor, a pivot motor, or another hydraulic operating element with two work chambers, or also groups of work chambers whose work surfaces act against one another, which are filled with fluid for the purpose of operation, and can be put in motion by means of differently great effects of the fluid on the work surfaces of the work chambers (for example, different pressures or differently sized work surfaces). In the case of a differential cylinder, the work chambers form the piston crown space and the piston rod space. Furthermore, the invention includes a pressure line and a tank line, whereby the tank line can open into a tank and the pressure line is connected with a pressure source, for example a pump, a pressure accumulator, or another assembly that is suitable for producing a corresponding pressure for the system.

Furthermore, a controller is present, which switches the actuating element connected with the two work chambers of the operating element. The controller can represent an electrical or electronic or mechanical or hydraulic controller. Furthermore, an actuating element having two fluid inputs which are each firmly connected with the pressure line and the tank line, and two fluid outputs which are firmly connected with one of the work chambers, are present. By means of this actuating element, the work chamber can be connected optionally either with the pressure line or the tank line, or the outflow of fluid from the work chamber in question can be blocked and adjusted by the controller. The actuating element can be configured differently, in terms of its structure, since it fulfills different tasks.

Furthermore, a measurement sensor is disposed on the hydraulic operating element or on the extension device, which sensor detects the position of the operating element and/or of the two supporting parts relative to one another. The measurement sensor is connected with the controller and emits a signal to the controller when a predetermined position of the supporting parts relative to one another or of the operating element is reached, and the controller thereupon adjusts the actuating element.

The device according to the invention furthermore consists of a pressure measurement system that is connected with one or both work chambers or the pressure line, and which emits a signal to the controller when a given pressure is reached. The controller thereupon interrupts the inflow of fluid to the operating element or limits it to leakage flow.

By means of these parts and their interaction, the controller can set the actuating element in order to move the operating element so that the work chamber from which fluid flows out to displace the operating element in the desired direction is connected with the tank line, and the work chamber into which fluid is introduced for the purpose of displacing the operating element in the desired direction is connected with the pressure line.

Biasing of the operating element and thus the extension device takes place after the measurement sensor transmits a signal to the controller, when or just before the desired position of the hydraulic operating element and/or the supporting parts relative to one another is reached. The controller sets the actuating element in such a way that it blocks flow of fluid out of the work chamber from which fluid has flowed out during the preceding displacement of the extension device, while the other work chamber is still connected with the pressure line, and thus the pressure in both work chambers is increased. This pressure increase is measured using the pressure measurement system.

Biasing of the device according to the invention is followed by the biased state of the hydraulic operating element and thus of the extension device. As soon as a predetermined pressure, the bias pressure, has been reached in one or both work chambers or the pressure line, the pressure measurement system emits a signal to the controller, which sets the actuating element in such a way that the flow of fluid out of the work chamber that took in fluid during the previous displacement of the operating element is blocked, so that fluid to which pressure is applied is contained in both work chambers of the operating element, which fluid is supported in the actuating element connected with each work chamber. Thus, the device is braced.

For relaxation of the operating element or the extension device, the controller sets the actuating element in such a way that at least one work chamber is connected with the tank line, so that fluid can flow off into the tank.

Operating states with overly high pressures represent a hazard for personnel of the operator and for the system. These operating states can occur, for example, as the result of an unforeseen collision of the load suspension device with an obstacle or as the result of improper operation.

Such operating states can be recognized (active system protection) with the device according to the invention. For this purpose, the pressure measurement system reports the fluid pressure detected to the controller in real time. The controller compares the measured pressure with a pressure value (monitoring pressure) that is predetermined for the work chamber in question or the pressure line, and shuts the pressure source off if this value is exceeded respectively, or sets the actuating element in such a way that the movement of the operating element reverses and/or reports this operating state.

This function can be advantageously combined with an embodiment of the extension device in which pressure-relief valves carry off the fluid is under excessive pressure, from the pressure line and/or from at least one work chamber into the tank line (passive system protection), in the event of excessive pressures. This can occur in a stand-alone manner or in addition to pressure-monitoring, when a pressure that is higher than the monitoring pressure but low enough not to damage the system is exceeded.

Since the excess amount of fluid has to be transported away within a short time in the event of an external impact on the extension device in the direction of effect of the operating element, the volume stream that must be transported away increases greatly. In order to circumvent the disadvantage of a long tank line (additional pressure increase due to a very high line resistance), a pressure accumulator can additionally be connected to the tank line, for practical purposes in the vicinity of the operating element.

It is advantageous if the actuating element at the work chambers of the operating element consists of two shut-off valves and a directional valve.

Alternatively to this, the device can also consist of an actuating element at the work chambers of the operating element that represent two 3/3-way directional valves, the inputs of which are connected with the pressure line and the tank line, respectively, and the outputs of which are each connected with one of the work chambers of the hydraulic operating element.

It is furthermore advantageous if the controller of the device switches the actuating element in such a way that the extension device remains braced only in the case of valves without power and/or shut-off power source, or only when power is applied to the valves and the pressure source is turned on, respectively.

The hydraulic operating element can be a hydraulic cylinder, a hydromotor, a pivot motor, or another hydraulic operating element with two work chambers or groups of work chambers, whose work surfaces act against one another, and which are filled with fluid for the purpose of operation, and can put the drive of the operating element in motion by means of different effects of the fluid on the work surfaces. The effects can be differing pressures and/or differently sized work surfaces.

In the event that the drive machine is a hydromotor, it is advantageous to follow this with a transmission.

The directional valve can be configured as a 3/4-way directional valve or a 3/3-way directional valve operated manually, mechanically, hydraulically, or electrically. Furthermore, the directional valve that interacts with the shut-off valve can be configured as a 2/4-way directional valve activated manually, mechanically, hydraulically, or electrically, which is reset by spring force or pressure.

It is furthermore advantageous that the 3/4-way directional valve can be configured in such a way that all of the connections are shut off in the center position. However, other advantageous embodiments of the directional valve are also possible. For example, the 3/4-way directional valve can have outputs relieved of pressure toward the tank in the center position.

For the case that the work surfaces of the operating element that act against one another are of different sizes, for example in the event of use of a differential cylinder, the directional valve can advantageously have a circuit, in an activated position, that connects both outputs with the pressure line. Furthermore, it is advantageous to configure the directional valve as a 2/4-way directional valve, whereby in one position, the one work chamber is connected with the tank line, or the other work chamber is connected with the pressure line, or in the other position, the tank line is blocked and both outputs are connected with the pressure line.

Furthermore, it is advantageous to configure the shut-off valves as check valves that can be opened electrically or hydraulically.

It is furthermore advantageous to configure the shut-off valves as counterbalanced check valves.

In another advantageous embodiment, the shut-off valves are configured either as check valves that can be opened without power or without pressure, respectively, or with power or with the application of pressure, respectively.

In another embodiment, the shut-off valves are configured in such a way that they shut off flow in both directions in the shut-off position, and can be adjusted electrically or hydraulically.

Furthermore, it is preferable to have a hydraulically or electrically activated pressure shut-off or pressure elimination, respectively.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention. The figures only show an electrical controller. A hydraulic controller, to which the invention relates in the same manner, is structured in analogous manner.

In the drawings, wherein similar reference characters denote similar elements throughout the several views.

DETAILED DESCRIPTION OF THE PREFERRED EMBODIMENT

Figure 1:
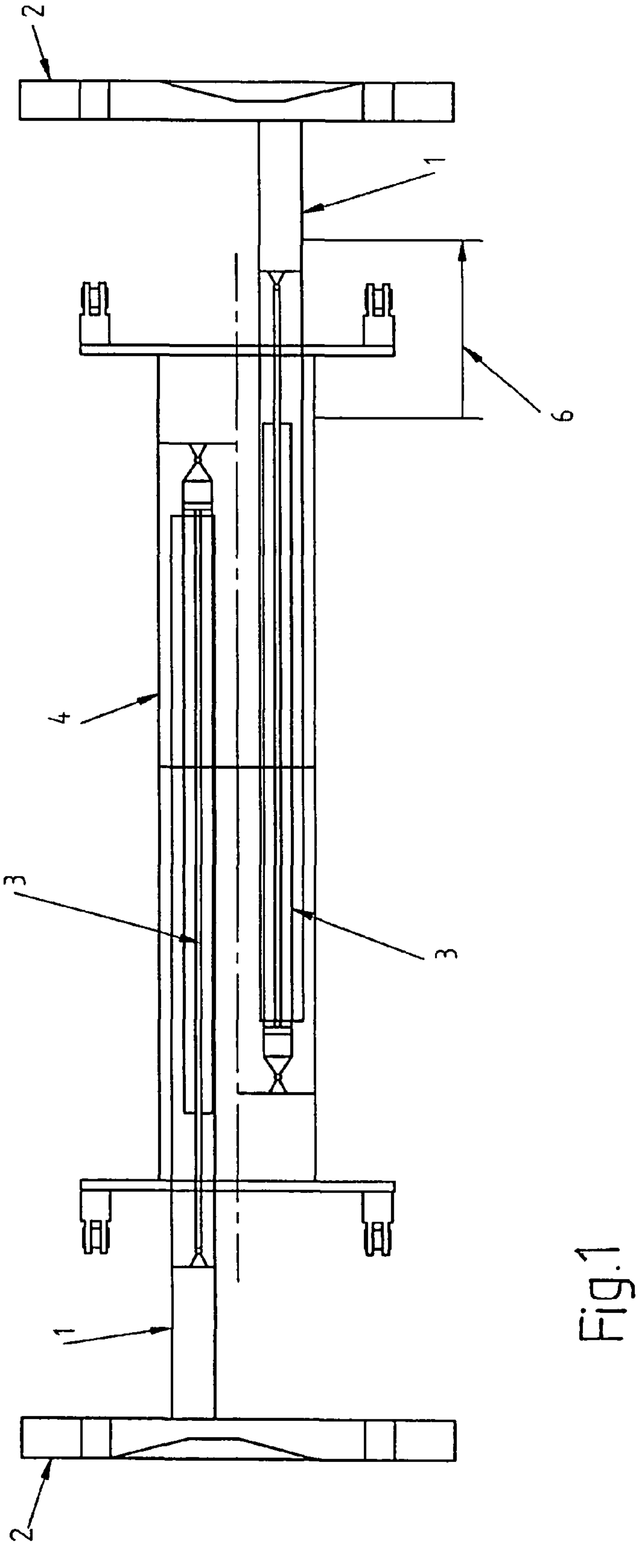
FIG. 1 shows a sectional top view of a load suspension device that can be braced.

Referring now in detail to the drawings, FIG. 1 shows a braced load suspension device consisting of three supporting parts 1, consisting of the extension bars of a spreader in a base frame 4. Head beams 2 are disposed on the extension bars, and twist locks can be situated on these. The supporting parts 1 (base frame and extension bars) can be moved relative to one another, in that the hydraulic operating elements 3, each having two work chambers 4, 5, (shown in FIG. 2) which represent the piston crown space and the piston rod space, are filled with a fluid such as oil in the present case, and to which pressure can alternately be applied. Hydraulic operating element 3 can be a hydraulic cylinder, a hydromotor followed by a transmission, or a pivot motor. Supporting parts 1 are firmly connected with hydraulic operating elements 3. Measurement sensors 6 are disposed between hydraulic operating elements 3 and supporting parts 1, which sensors transmit a signal to controller 7 when or shortly before the desired position of hydraulic operating element 3, or supporting parts 1, relative to one another is reached.

FIGS. 2 to 5 show an operating element 3 having work chambers 4, 5, which are connected with pressure line 9 or tank line 10 by way of actuating element 8.

Figure 2:
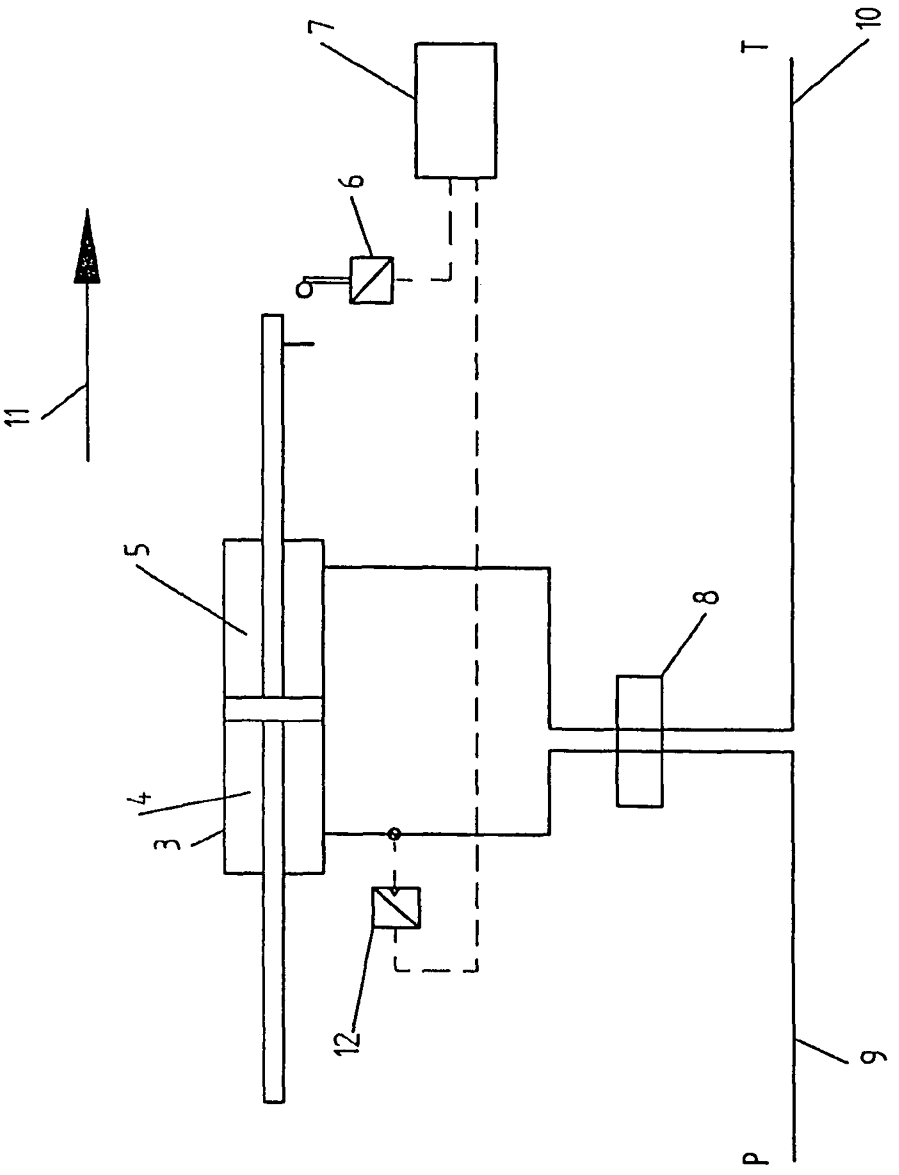
FIG. 2 shows a device according to the invention in the switching state where the operating element will be displaced to the right.

In the switching state shown in FIG. 2, both the pressure line 9 and the tank line 10 are connected with the work chambers 4, 5 by means of actuating element 8, so that the fluid flows through pressure line 9 into left work chamber 4, and thus displaces the power take-off of operating element 3, for example the piston of a hydraulic cylinder, in the movement direction 11 to the right. The dimension by which hydraulic operating element 3 is displaced is recorded by a measurement sensor 6, which emits a signal to controller 7 shortly before or when a predetermined position of operating element 3 or of supporting parts 1 relative to one another is reached, and the controller then adjusts actuating element 8.

Furthermore, pressure measurement system 12 is disposed in the connecting lines between the work chambers of operating element 3 and actuating element 8, or in pressure line 9.

Figure 3:
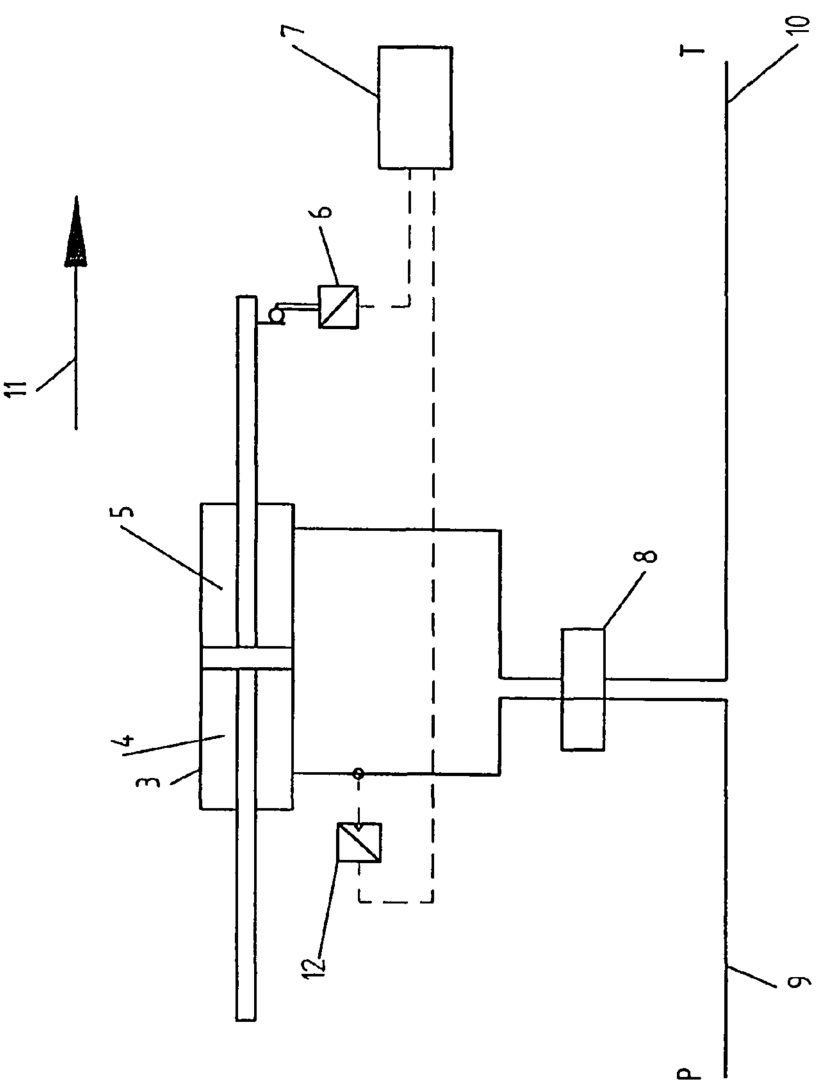
FIG. 3 shows a view of the device according to the invention in the switching state where the operating element will be biased.

As soon as or just before operating element 3 and thus supporting parts 1 have reached the predetermined position relative to one another (FIG. 2), controller 7 switches actuating element 8 in such a way that tank line 10 is blocked and fluid is now conveyed only into work chamber 4, through pressure line 9, so that the pressure in both work chambers 4, 5 increases, and the device or operating element 3, respectively, is biased (FIG. 3). This biasing takes place until a specific bias pressure has been reached in one or both work chambers 4, 5. This is measured by means of pressure measurement system 12, which emits a signal to controller 7 when a predetermined pressure is reached. Pressure measurement system 12 can consist of a known pressure switch or a known analog pressure sensor in the case of an electrical or electronic controller. Depending on the type of signal that is emitted by pressure measurement system 12 (analog or switching states), this signal is processed differently in the controller.

Figure 4:
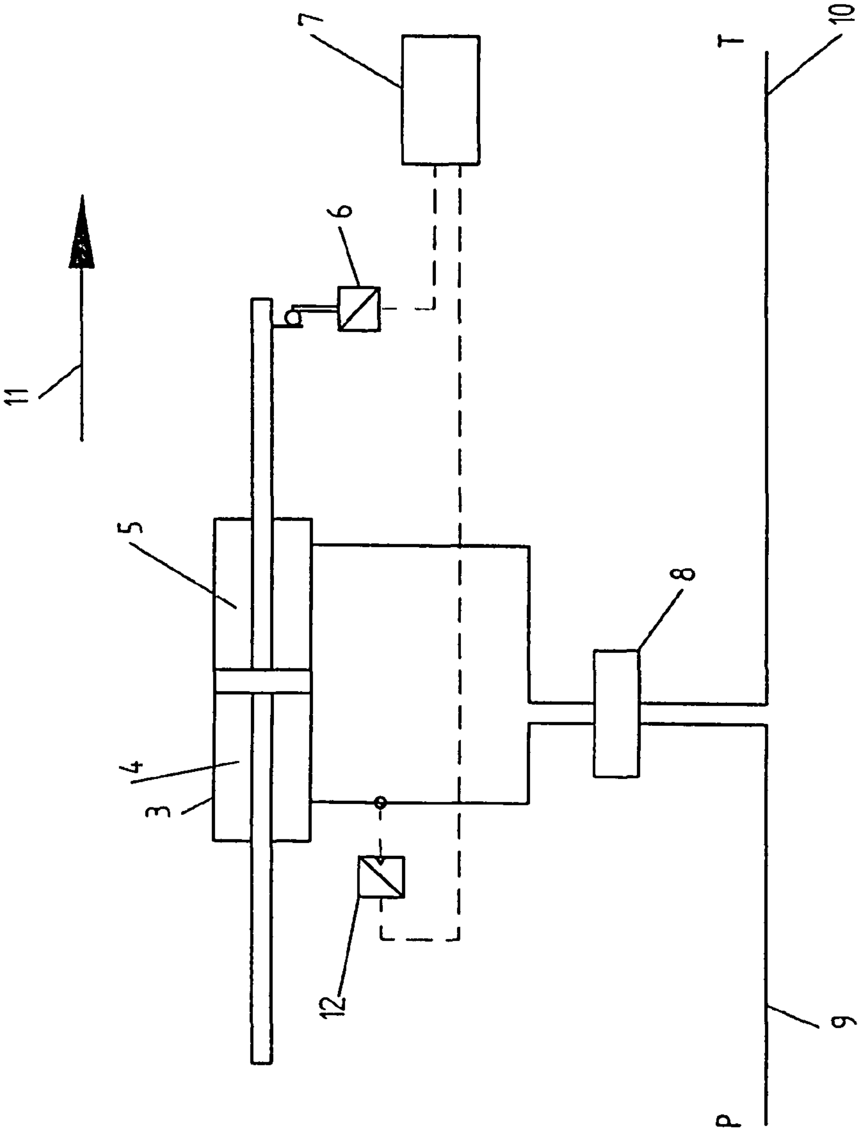
FIG. 4 shows a view of the device according to the invention in the switching state where the operating element is braced.

Triggered by the signal of pressure measurement system 12 to controller 7, the latter sets actuating element 8 in such a way that pressure line 9 is also blocked, both fluid volumes in work chambers 4, 5 support themselves in the actuating element 8, and the operating element 3 is braced. This work position of the actuating element 8 is shown in FIG. 4.

Figure 5:
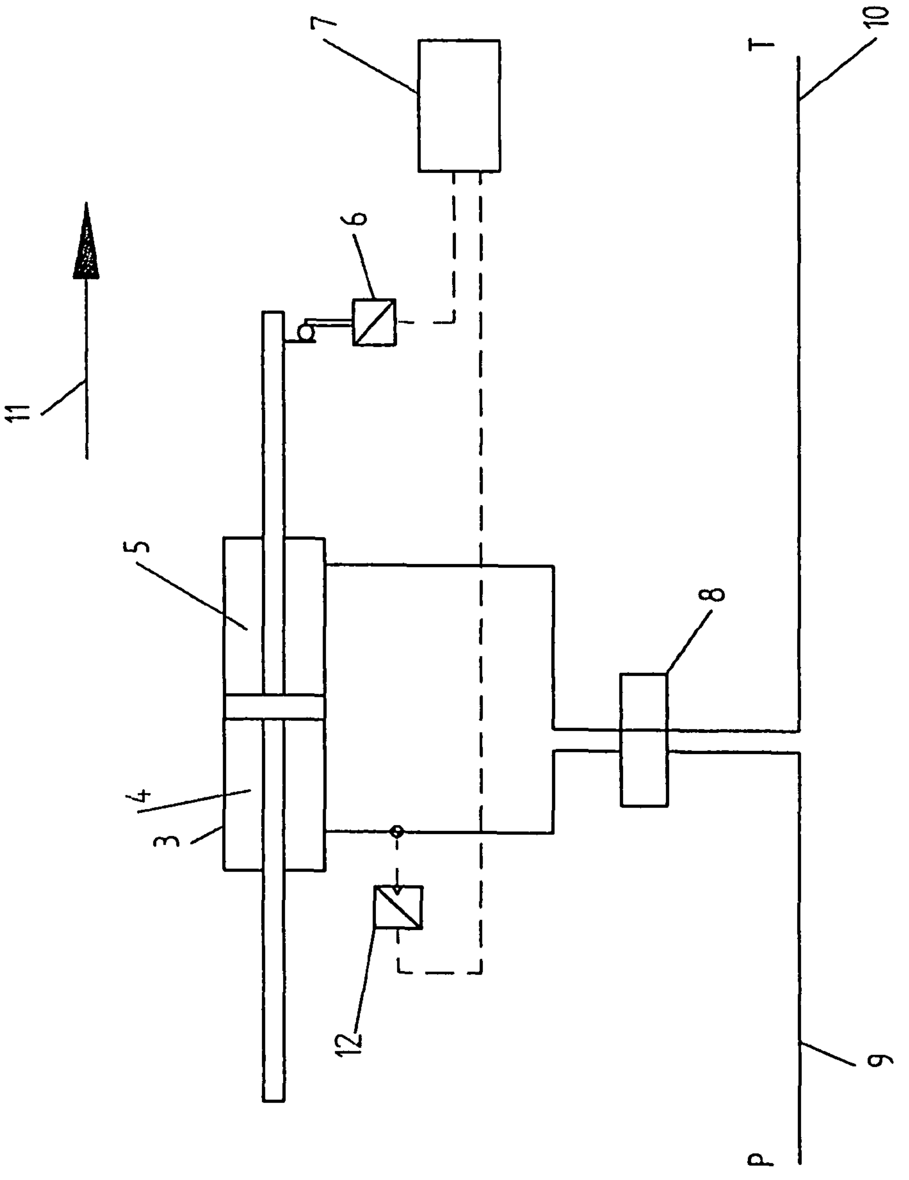
FIG. 5 shows a view of the device according to the invention in the switching state where the operating element will be relaxed.

FIG. 5 shows the position of actuating element 8 during relaxation of the operating element, whereby one or both work chambers 4, 5 of operating element 3 are connected with tank line 10, so that the fluid in work chambers 4, 5 relaxes, in that the fluid flows off into the tank through tank line 10.

Figure 6:
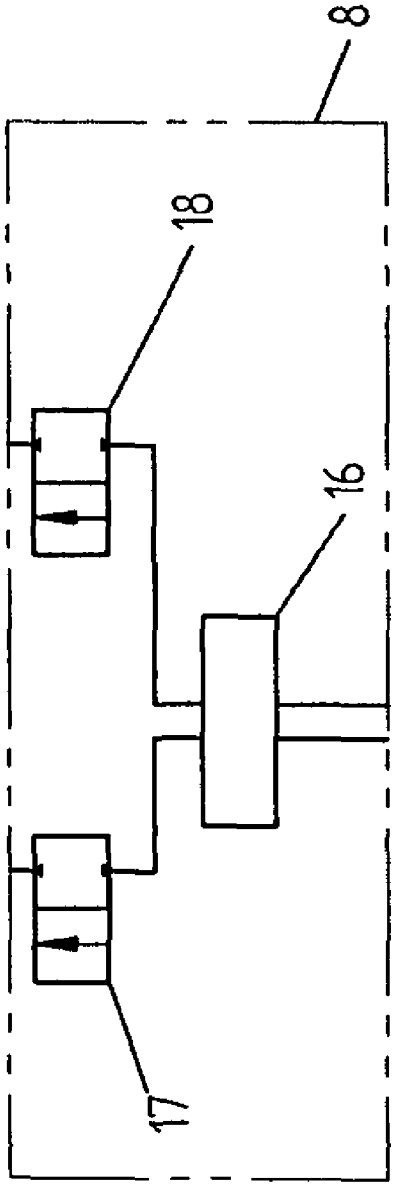
FIG. 6 shows a detail representation of the actuating element with two shut-off valves and a directional valve.
Figure 13:
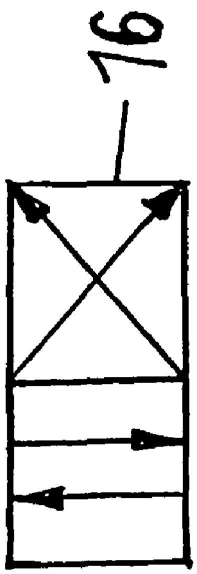
FIG. 13 shows a detail representation of a 2/4-way directional valve.

In an advantageous embodiment, as shown in FIG. 6, actuating element 8 consists of two shut-off valves 17, 18 that have outputs firmly connected with work chambers 4, 5, and have inputs that are firmly connected with the outputs of a directional valve 16, which valve, in turn, is firmly connected at its inputs with pressure line and tank line 9, 10. Shut-off valves 17, 18 could be configured as kick-back valves that can be opened, either without power or without pressure, or with the application of power or pressure. Lowering/braking valves could also be used. A suitable 2/4-way directional valve is shown in FIG. 13, which valve can be used if the bias pressure is not exceeded by the work pressure that occurs in the system.

Figure 7:
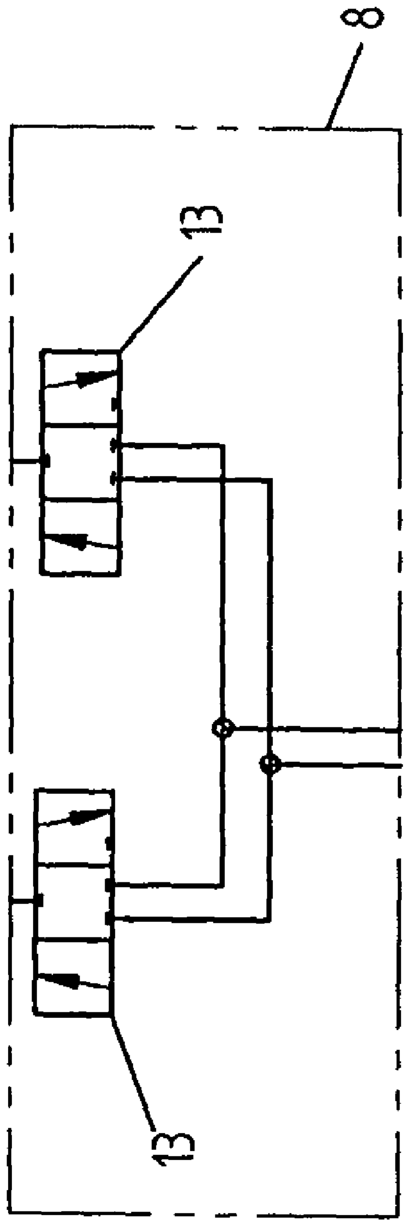
FIG. 7 shows the actuating element with two 3/3-way directional valves.

FIG. 7 shows a preferred embodiment, as an alternative to FIG. 6, in which actuating element 8 is formed by two 3/3-way directional valves 13.

The two variants allow reaching the aforementioned switching states in different ways. The directional valves 16 can be configured differently, as shown by FIGS. 8 to 11.

Figure 8:
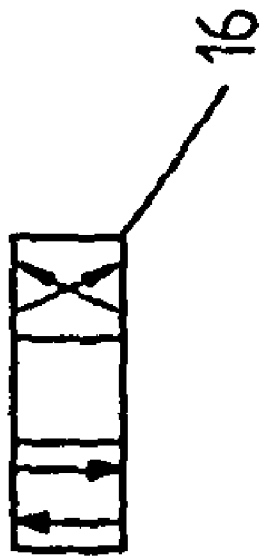
FIGS. 8 to 11 show embodiments for directional valves.
Figure 9:
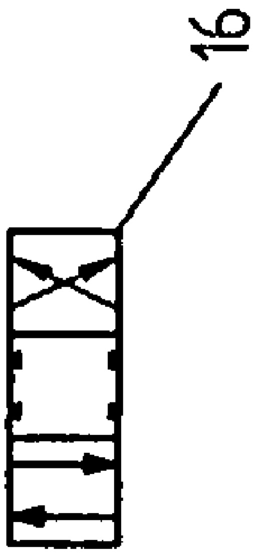

FIG. 8 shows directional valve 16 in an embodiment as a 3/4-way directional valve, FIG. 9 shows the directional valve 16 as a 3/4-way directional valve with shut-off of all the connections in the center position.

Figure 10:
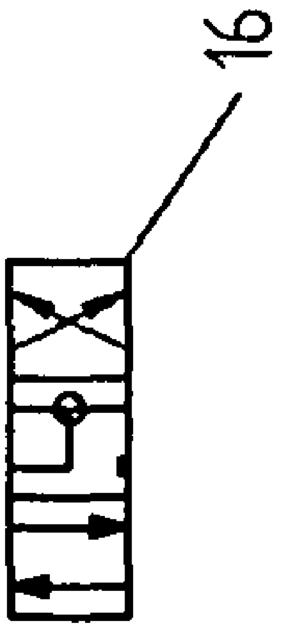

FIG. 10 shows the directional valve 16 as a 3/4-way directional valve in the embodiment in which the outputs are relieved of stress toward the tank in the center position.

Figure 11:
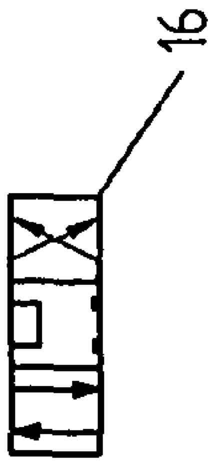

FIG. 11 shows the directional valve 16 as a 3/4-way directional valve that connects work chambers 4, 5 in the center position and shuts off pressure line 9 and tank line 10.

Figure 12:
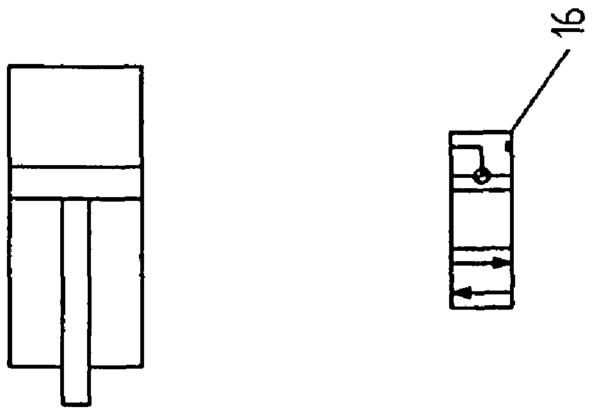
FIG. 12 shows a directional valve for controlling a differential cylinder.

FIG. 12 shows directional valve 16 in an embodiment that can be used if hydraulic operating element 3 represents a differential cylinder. Directional valve 16 is configured, in the present case, in such a way that it connects both outputs with pressure line 9 in an activated position.

FIG. 13 shows a directional valve 16 that finds use in the embodiment according to FIG. 6.

Figure 14:
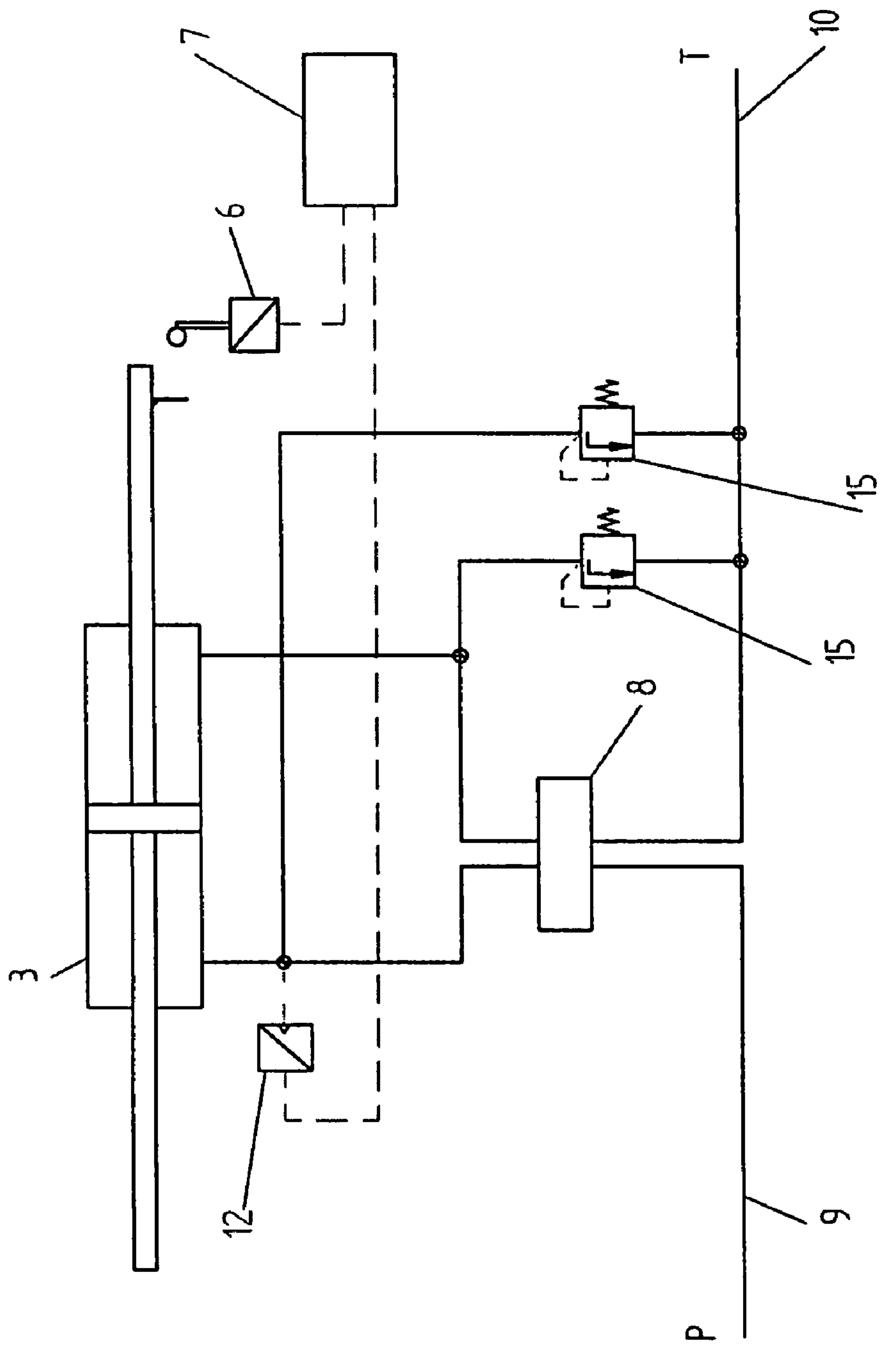
FIG. 14 shows the device according to the invention with pressure relief valve.

FIG. 14 shows the embodiment of an extension device in which two pressure relief valves 15 conduct the fluid that is under excessive pressure out of pressure line 9 and/or out of at least one of the work chambers 4, 5 into tank line 10 (passive system protection), in the event of excessive pressure, when a pressure that is higher than the monitoring pressure but low enough not to damage the system is exceeded.

Since the excess amount of fluid has to be transported away within a short time in the event of an external impact on the extension device in the direction of effect of operating element 3, the volume stream that must be transported away increases greatly. In order to circumvent the disadvantage of a long tank line 10 (additional pressure increase due to a very high line resistance), a pressure accumulator 14 is additionally connected to the tank line 10, for practical purposes in the vicinity of operating element 3.

Figure 15:
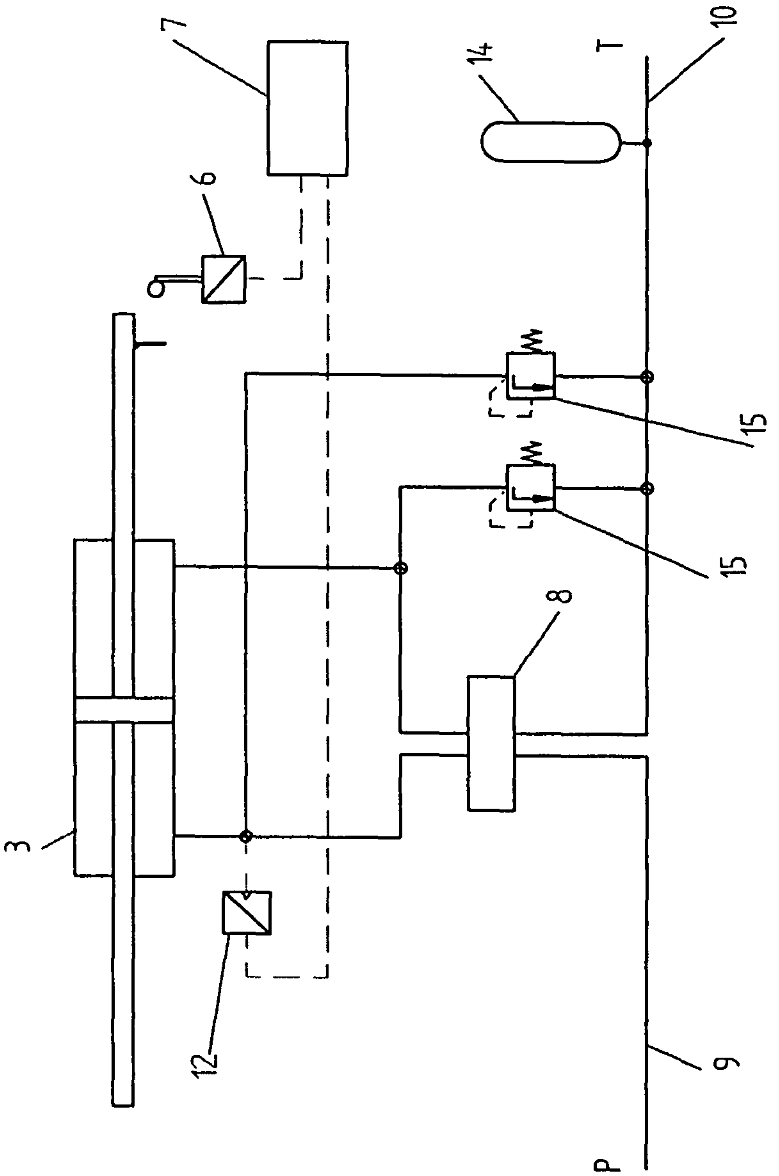
FIG. 15 shows the device according to the invention with pressure accumulator.

FIG. 15 shows the same circuit as in FIG. 14, whereby in addition, the pressure accumulator 14 is disposed on the tank line 10, in which fluid can flow away.

The present invention has the advantage that the extension device remains braced when the system is without current or without pressure, respectively, or when current or pressure is applied, without a module with a shape-fit locking device being present. The present invention has is inexpensive to produce, service and maintain, and minimizes damage in the event of an impact of the supporting parts. Therefore, no shut-down times are to be expected, and impact stresses on the operating element, caused by the hydraulic system, which are transferred by a bolt device, are avoided.

Accordingly, while only a few embodiments of the present invention have been shown and described, it is obvious that many changes and modifications may be made thereunto without departing from the spirit and scope of the invention.

What is claimed is:

1. A load suspension device that can be adjusted, locked, and braced horizontally, by means of hydraulics, and having an extension device, comprising:

two supporting parts that can be moved relative to one another;

a hydraulic operating element with two work chambers, said hydraulic operating element being firmly connected with one of the supporting parts and supported in the other supporting part, wherein said hydraulic operating element adjusts the two supporting parts relative to one another by moving;

a pressure line;

a tank line;

an actuating element connected with the two work chambers of the operating element and having two fluid inputs that are firmly connected with the pressure line and the tank line, and two fluid outputs that are each connected with one of the work chambers, and which connect each work chamber with either the pressure line or the tank line, or blocks the outflow of fluid from the respective work chamber;

a controller which controls the operation of the actuating element;

a measurement sensor disposed on the hydraulic operating element or on the extension device, said sensor detecting a position of the operating element and a position of the two supporting parts relative to one another; and a signaling device that emits a signal to the controller when a given pressure is reached, and wherein the controller thereupon interrupts an inflow of fluid to the operating element or limits the inflow to leakage flow;

wherein in order to displace the operating element, the controller sets the actuating element so that the respective work chamber from which fluid is flowing to displace the operating element in a desired direction is connected with the tank line, and the respective work chamber into which fluid is introduced to displace the operating element in the desired direction is connected with the pressure line;

wherein the measurement sensor is adapted to transmit a signal to the controller, when or just before a desired position of the hydraulic operating element and the supporting parts relative to one another is reached, and the controller is adapted to set the actuating element so that the actuating element blocks flow of fluid out of the work chamber from which fluid has flowed out during preceding displacement of the extension device, while the other work chamber is still connected with the pressure line, and thus the pressure in both work chambers is increased so that biasing of the operating element and the supporting parts relative to one another takes place;

wherein biasing following a biased state of the hydraulic operating element and thus of the extension device is achieved in that as soon as a predetermined bias pressure has been reached in one or both of the work chambers, the signaling device is adapted to emit a signal to the controller, which sets the actuating element so that flow of fluid out of the work chamber that took in fluid during previous displacement of the operating element is blocked, so that fluid to which pressure is applied is contained in both work chambers of the operating element, said fluid being supported in the actuating element connected with each work chamber;

and wherein for relaxation of the extension device, the controller is adapted to set the actuating element so that at least one of the work chambers is connected with the tank line.

2. The device according to claim 1, further comprising a pressure measurement system connected with one or both work chambers or the pressure line, said pressure measurement system emitting a signal to the controller when a given pressure is reached, whereupon the controller interrupts an inflow of fluid to the operating element or limits it to leakage flow, or undertakes a time-controlled shut-off of the inflow of fluid.

3. The device according to claim 1, wherein the actuating element consists of two 3/3-way directional valves.

4. The device according to claim 1, wherein the actuating element consists of two shut-off valves and a directional valve.

5. The device according to claim 1, wherein the controller is adapted to switch the actuating element so that the extension device remains braced only when the actuating element is without power or a pressure source is shut off, or only when the actuating element has power applied to it or the pressure source is turned on.

6. The device according to claim 1, wherein the hydraulic operating element is a hydraulic cylinder, a hydromotor, or a pivot motor.

7. The device according to claim 1, further comprising a timing element that accomplishes shut-off of a pressure source.

8. The device according to claim 4, wherein the directional valve is configured as a 3/4-way directional valve.

9. The device according to claim 4, wherein the directional valve is configured as a 2/4-way directional valve.

10. The device according to claim 8, wherein the directional valve has connections blocked in a center position.

11. The device according to claim 8, wherein the directional valve has outputs relieved toward a tank in a center position.

12. The device according to claim 8, wherein the directional valve has outputs connected in a center position and the tank line is blocked.

13. The device according to claim 8, wherein the directional valve, in an activated position, connects two outputs with the pressure line and blocks the tank line.

14. The device according to claim 9, wherein the directional valve, in one position, connects one of the work chambers with the tank line and the other work chamber with the pressure line, and in another position blocks the tank line and connects two outputs with the pressure line.

15. The device according to claim 4, wherein the shut-off valves are configured as kick-back valves that can be opened.

16. The device according to claim 4, wherein the shut-off valves are configured as lowering/braking valves.

17. The device according to claim 15, wherein the shut-off valves can be opened either without power or without pressure, or with the application of power or pressure.

18. The device according to claim 4, wherein the shut-off valves can be shut off in two directions in a shut-off position, and can be adjusted electrically or hydraulically.

19. The device according to claim 1, further comprising a pressure-limiting valve as overload protection.

20. The device according to claim 19, wherein the pressure-limiting valve is a pressure accumulator.

21. The device according to claim 19, wherein the overload protection is connected with the tank line.

* * * * *